June 17, 1969 G. K. FARNEY 3,450,932

REENTRANT BEAM CROSSED-FIELD AMPLIFIER WITH ELECTRONIC FEEDBACK INHIBITING FILTER

Filed March 2, 1966

INVENTOR,
GEORGE K. FARNEY

BY Harry M. Saragovitz
Edward J. Kelly, Herbert Berl
Julian C. Keppler
ATTORNEYS United States Patent Office 3,450,932

Patented June 17, 1969

3,450,932

REENTRANT BEAM CROSSED-FIELD AMPLIFIER WITH ELECTRONIC FEEDBACK INHIBITING FILTER

George K. Farney, New Providence, N.J., assignor, by mesne assignments, to the United States of America as represented by the Secretary of the Army Filed Mar. 2, 1966, Ser. No. 533,127
Int. Cl. H01j 25/34, 25/50
U.S. Cl. 315—3.6 2 Claims

ABSTRACT OF THE DISCLOSURE

A filter used to inhibit electronic feedback in reentrant beam crossed-field amplifiers is disclosed. In reentrant beam crossed-field amplifiers, space charge remaining in a spoke formation as it rotates past the output end of the slow wave circuit back toward the input provides a source of electronic feedback if the space charge remains concentrated. The filter disclosed is incorporated in the slow wave structure of the amplifier tube and is itself a slow wave structure having a passband frequency different from the passband frequency of the slow wave structure of the amplifier tube.

This invention relates to crossed-field amplifiers, and more particularly to a filter used to inhibit electronic feedback in reentrant beam crossed-field amplifiers.

In a reentrant beam crossed-field amplifier operating under normal conditions, space charge from a stream of electrons rotating about the cathode is phase focused to the anode under the influence of the RF fields. The space charge is funneled to the anode through spatial boundaries called "spokes" because of the resemblance to spokes of a wheel. This operation is similar to that which occurs in a magnetron. RF power is added to the slow wave circuit of the crossed-field amplifier tube as current is collected on the anode. Space charge remaining in a spoke formation as it rotates past the output end of the slow wave circuit back toward the input provides a source of electronic feedback if the space charge remains concentrated. This source of electronic feedback causes either regeneration or degeneration in gain, depending on the phase of the reentering spoke, and thereby causes undesirable cyclic variations in gain. In prior art crossed-field amplifier tubes, the electronic feedback is reduced by providing a drift space between the RF input and output on the slow wave circuit. This drift space allows space charge forces to cause debunching or spreading of the spokes. If the drift space is sufficiently long, the electronic feedback effects are essentially eliminated.

Under certain conditions it may not be desirable or it may not be feasible to provide a drift space of sufficient length to cause space charge debunching. I have invented a filter circuit to enhance space charge debunching more effectively in a short distance.

Therefore, an object of my invention is to eliminate electronic feedback in a reentrant beam crossed-field amplifier.

Another object of my invention is provided space charge debunching by means of a filter circuit incorporated in the slow wave circuit of a crossed-field amplifier tube.

The above mentioned and other objects of my invention will be apparent by reference to the following detailed description and accompanying drawing in which.

Figure 1:
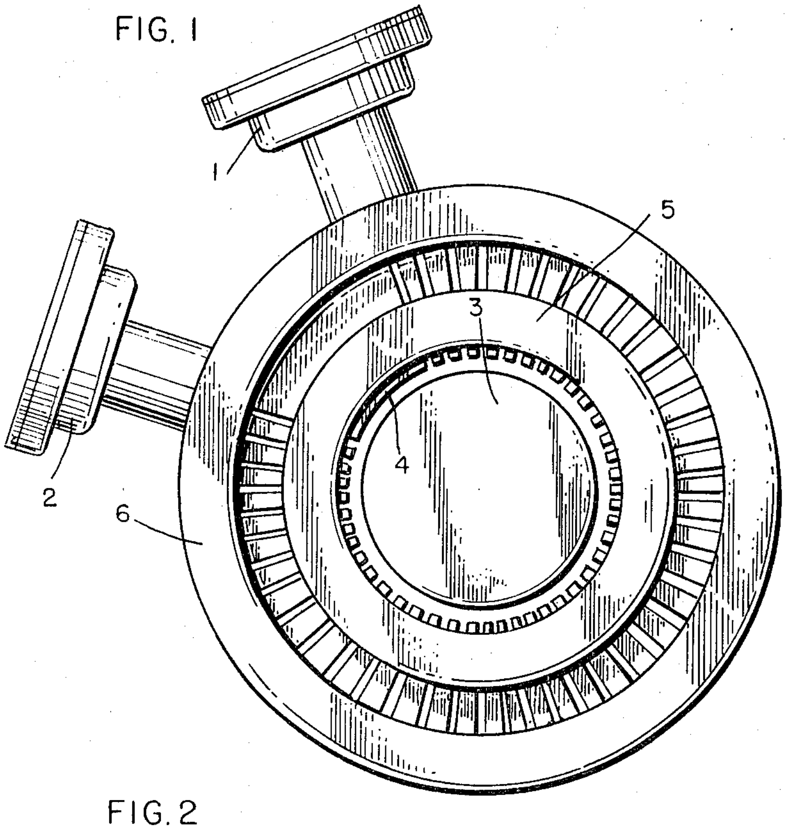
FIG. 1 shows a crossed-field amplifier tube having a conventional drift space.
Figure 2:
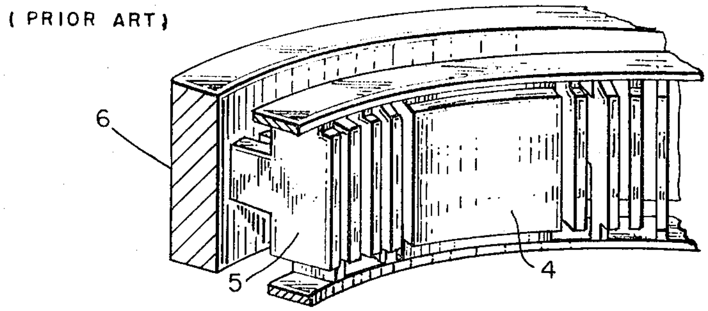
FIG. 2 (PRIOR ART)
FIG. 2 is a cross-sectional view of the drift space and a part of the slow wave circuit of FIG. 1.

Referring to FIG. 1 which shows a conventional crossed-field amplifier tube and to FIG. 2 which shows a part of FIG. 1, a cathode 3 is surrounded by a slow wave circuit 5 and an anode 6. A drift space 4 for space charge debunching is provided in the slow wave circuit. RF input is applied to the crossed-field tube by means of an input coupler 1 and the output is extracted by means of an output coupler 2.

Cathode 3 is operated as a cold cathode and a D.C. voltage (not shown) is normally applied between anode 6 and cathode 3. Since there is no thermionic emission, no current will be drawn in the absence of an input signal. When an RF input signal is applied cathode 3 will emit a copious supply of secondary electrons due to electron bombardment of the cathode and the tube will be turned on. The electron cloud formed is reentrant (i.e. electrons are permitted to circulate around the tube). Amplification is obtained in this type of amplifier by a crossed-field traveling wave interaction between circuit wave and the space charge cloud.

Heavily bunched electron spokes are created by the action of slow wave circuit 5 and the RF field. These heavily bunched electron spokes will feedback into the input and cause cyclic variations in gain. As shown in FIGS. 1 and 2, this electron feedback problem has been eliminated by incorporating a drift space between the input and output. The drift space is essentially nothing more than a discontinuation of the slow wave circuit. When the electrons enter the drift space, they debunch under the influence of their own space charge since there are no RF fields in this region. This method of debunching of the electron spokes is very effective provided a sufficiently long drift space can be provided.

It is not always possible or desirable to utilize a drift space of sufficient length for an effective electron debunching. Prior to my invention no simple and effective means had been devised to obtain electron debunching in a short distance.

Figure 3:
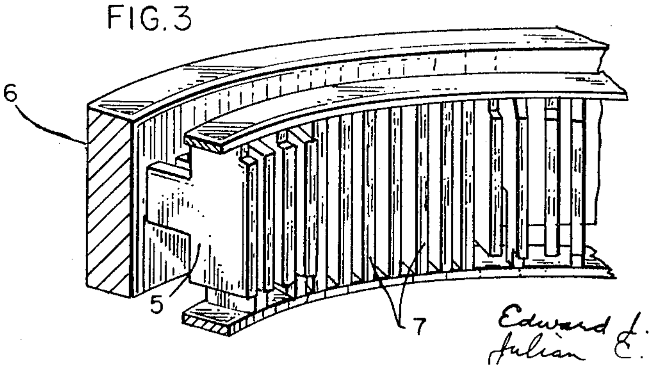
FIG. 3 is a cross-sectional view of the slow wave circuit of FIG. 1 with a filter, constructed in accordance with my invention, incorporated in the slow wave circuit.

Referring to FIG. 3, my invention is shown as a filter 7 incorporated in the slow wave structure 5. In FIG. 3, filter 7 is a slow wave circuit having a passband frequency different than the passband frequency of slow wave circuit 5. The RF fields on filter 7 tend to produce new electron spokes having a frequency corresponding to the passband of filter 7, but this can not be accomplished without first redestributing the space charge in the reentering spoke system. If filter 7 is sufficiently short the new spoke system will not be fully established by the time electrons traverse the filter. Thus the net effect of filter 7 is to mix the space charge so that the electron feedback will not be coherent.

While a specific type of filter structure has been shown and described it will be apparent to those skilled in the art that my invention includes any type of filter structure capable of mixing up the electron spoke system in a reentrant crossed-field amplifier provided of course that the filter can be incorporated into the slow wave structure of the amplifier. Therefore, it is my intention that the scope of my invention be determined by the following claims and not by the specific embodiment shown and described.

I claim:

1. A reentrant beam amplifier with crossed electrostatic and electromagnetic fields comprising: RF input means; RF output means; an anode; a cathode; a slow wave circuit fabricated into a ring concentric with said anode and cathode and spaced between said anode and said cathode, said slow wave circuit having a single, first defined passband frequency; and filter means having a second defined passband frequency different from said first passband frequency for removing coherent feedback between said input and said output means, said filter being so located in said slow wave structure that it lies between said input and output means, said filter comprising partitions which are physically connected at both ends to the circular segments of the ring slow wave structure.

2. A reentrant beam crossed-field amplifier as described in claim 1 wherein said anode and said cathode are concentric circular electrodes with the anode surrounding the cathode.

References Cited

UNITED STATES PATENTS

| | | | |
|---|---|---|---|
| 3,046,443 | 7/1962 | Dench | 315—3.6 |
| 3,121,821 | 2/1964 | Yu | 315—39.75 X |
| 3,176,188 | 3/1965 | Wilbur | 315—39.69 |

H. K. SAALBACH, *Primary Examiner.*

SAXFIELD CHATMON, Jr., *Assistant Examiner.*

U.S. Cl. X.R.

315—39.3, 39.73